United States Patent [19]

Heck

[11] Patent Number: 5,353,660

[45] Date of Patent: Oct. 11, 1994

[54] LOCKING MECHANISM

[75] Inventor: Thomas Heck, Mainz, Fed. Rep. of Germany

[73] Assignee: General Motors Corporation, Detroit, Mich.

[21] Appl. No.: 22,041

[22] Filed: Feb. 24, 1993

[30] Foreign Application Priority Data

Mar. 3, 1992 [DE] Fed. Rep. of Germany ... 420662298

[51] Int. Cl.⁵ .................. G05G 5/06; E05C 17/16; E05F 3/22
[52] U.S. Cl. ......................... 74/96; 16/82; 49/346; 292/268; 454/139
[58] Field of Search ................. 74/96; 16/82; 49/346; 292/268

[56] References Cited

U.S. PATENT DOCUMENTS

| 613,171 | 10/1898 | McLaren | 49/346 |
|---|---|---|---|
| 1,148,375 | 7/1915 | Gallup | 74/96 |
| 2,185,486 | 1/1940 | Wahlberg | 454/139 |
| 2,235,642 | 3/1941 | Lintern et al. | 454/139 |
| 3,639,943 | 2/1972 | Cadiou | 16/82 X |
| 3,980,331 | 9/1976 | Kennedy et al. | 16/82 X |
| 4,651,583 | 3/1987 | Suzuki | 74/96 |
| 4,653,689 | 3/1987 | Sakurai et al. | 237/12.3 |
| 5,244,273 | 9/1993 | Kaspar et al. | 16/82 X |

FOREIGN PATENT DOCUMENTS

| 3904570 | 8/1989 | Fed. Rep. of Germany . |
| 2407114 | 5/1979 | France . |
| 61-181717 | 8/1986 | Japan . |
| 1-204815 | 8/1989 | Japan ..................... 74/96 |

Primary Examiner—Allan D. Herrmann
Attorney, Agent, or Firm—Patrick M. Griffin

[57] ABSTRACT

The invention pertains to a locking mechanism consisting of a guide lever arm (1) and a sliding lever arm (5), in which one end of each of the lever arm pivots about a bearing (10, 11) at a certain distance from the other lever arm, in which the other end of the sliding lever arm (5).is slidingly coupled with a slot (4) in the other end of the guide lever arm (1) by a pin (7) connected with the sliding lever arm (5), and in which the lever arms can be swiveled into two end positions. A force (2) exerted on the guide lever arm (1) in one of the end positions for the purpose of swiveling the guide lever arm (1) into the other end position is compensated in a selflocking way in the slot (4) by a recess in the area of the other end of the guide lever arm (1), and this locking effect can be removed only by a force (6) exerted on the sliding lever arm (5) in the direction of the other end position.

1 Claim, 4 Drawing Sheets

LOCKING MECHANISM

The invention pertains to a locking mechanism consisting of a guide lever arm and a sliding lever arm, in which one end of each of the lever arms pivots about a bearing at a certain distance from the other lever arm, in which the other end of the sliding arm is slidingly coupled with a slot in the other end of the guide lever arm by a pin connected with the sliding lever arm, and in which the lever arms can be swiveled into two end positions.

BACKGROUND OF THE INVENTION

U.S. Pat. No. 4,651,583 describes a locking mechanism. The locking effect is brought about by the action of a spring, which is supported on the stationary bearing of the guide lever arm and holds the pin of the sliding lever arm pressed into the given end position. In accordance with the state of the art, the locking mechanism is swiveled by compressing the spring and causing the pin to slide in the groove until the two lever arms swivel into the other end position, and the spring effect is activated and the end position is thus secured.

A locking mechanism of this type has the disadvantage that, when the swiveling occurs from one end position to the other, force must be continuously applied against the action of the spring. Furthermore the spring is an additional component that complicates a mechanism that is relatively simple in itself.

SUMMARY OF THE INVENTION

The goal of the present invention was to modify a locking mechanism of the type described in the introductory clause of claim 1 in such a way that a locking effect would be achieved without additional components and that less operating force would be needed to swivel from one end position to the other end position.

This goal is achieved in accordance with the invention in such a way that a force exerted on the guide lever arm in one of the end positions for the purpose of swiveling the guide lever arm into the other end position is compensated in a self-locking way in the slot by a recess in the area of the other end of the guide lever arm, and that this locking effect can be removed only by a force applied to the sliding lever arm in the direction of the other end position.

The locking mechanism of the invention has the important advantage that no additional components are required for locking, but rather it is only necessary to cut out a longitudinal slot, and a large self-locking force is achieved, which is greater than comparable spring forces in accordance with the state of the art. In this connection, only the reaction force of the sliding lever arm is utilized, which is supported on its bearing against a forced exerted on the guide lever arm from the outside.

The design of the slot provides for the recess in the area of the other end of the guide lever arm to have an arc-shaped surface with a sectoral cutout angle greater than 180 degrees and a diameter which is only slightly greater than the width of the slot itself. The guide lever arm can be acted on by a force directed against the given end position by a mechanical system coupled with the guide lever arm, but it is not brought into the other end position by this force, but rather remains self-locked in its present position. To remove the locking effect, a force is transmitted to the sliding lever arm by a control element and a mechanical device that engages the sliding lever arm. In a preferred embodiment of the invention, the mechanical device is a Bowden cable attached to the pin of the sliding lever arm, and the control element is a sliding control element. In a preferred example of the invention, the mechanical system coupled with the guide lever arm is a flap of a fan system of a motor vehicle for selective adjustment of the operating mode to fresh-air operation or circulating-air operation as the two corresponding end positions of the locking mechanism. In another example of the invention, the coupled mechanical system is the engine hood with the open and closed states as the two corresponding end positions. In a third example of the invention, the mechanical system coupled with the guide lever arm is the sliding roof with a stand-up position and with the open and closed states as the two corresponding end positions.

Additional advantageous designs of the invention are specified in the subclaims.

DESCRIPTION OF THE PREFERRED EMBODIMENTS

Examples of the invention are shown in the drawings.

Figure 1:
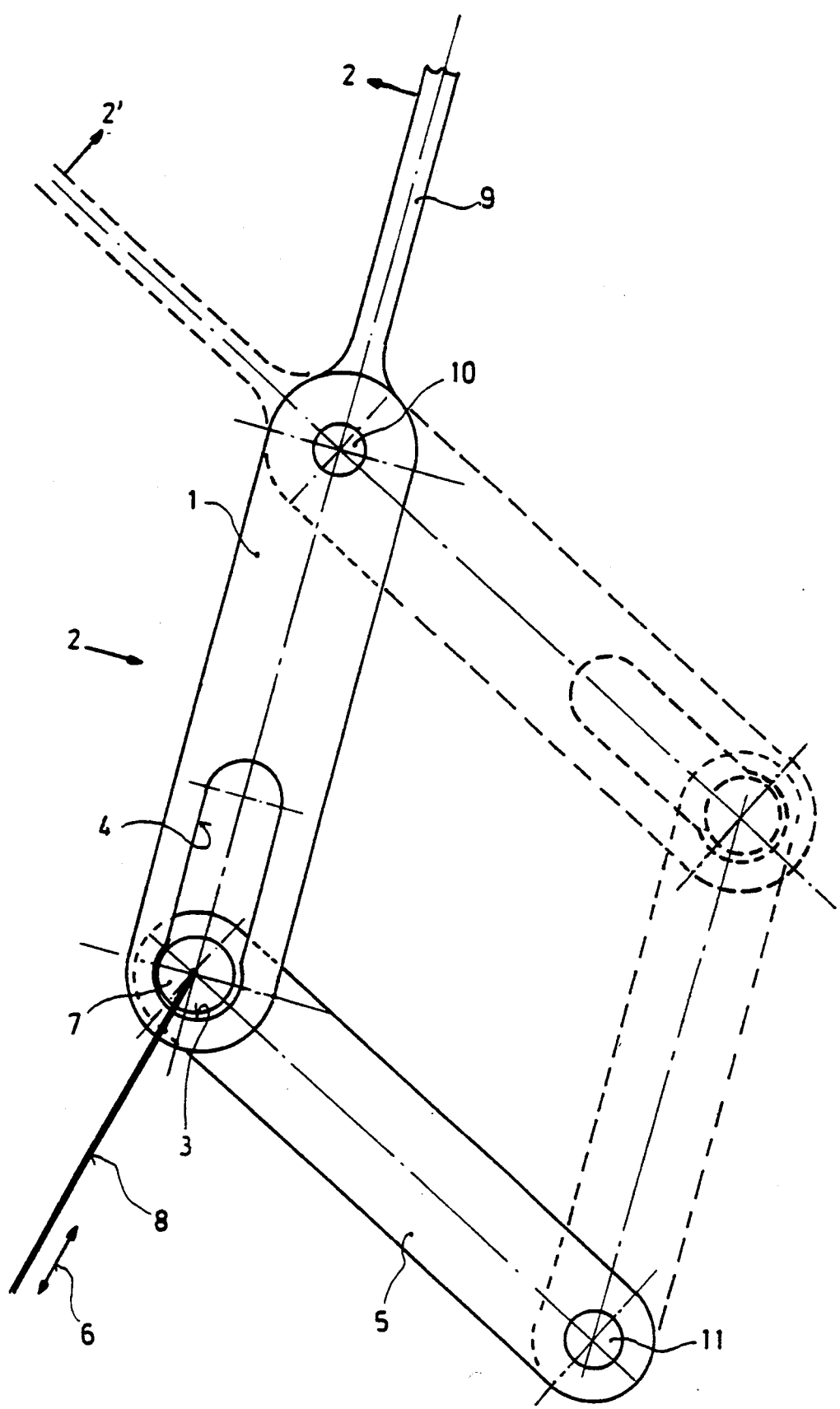
FIG. 1 shows the basic action of the locking mechanism.
Figure 2:
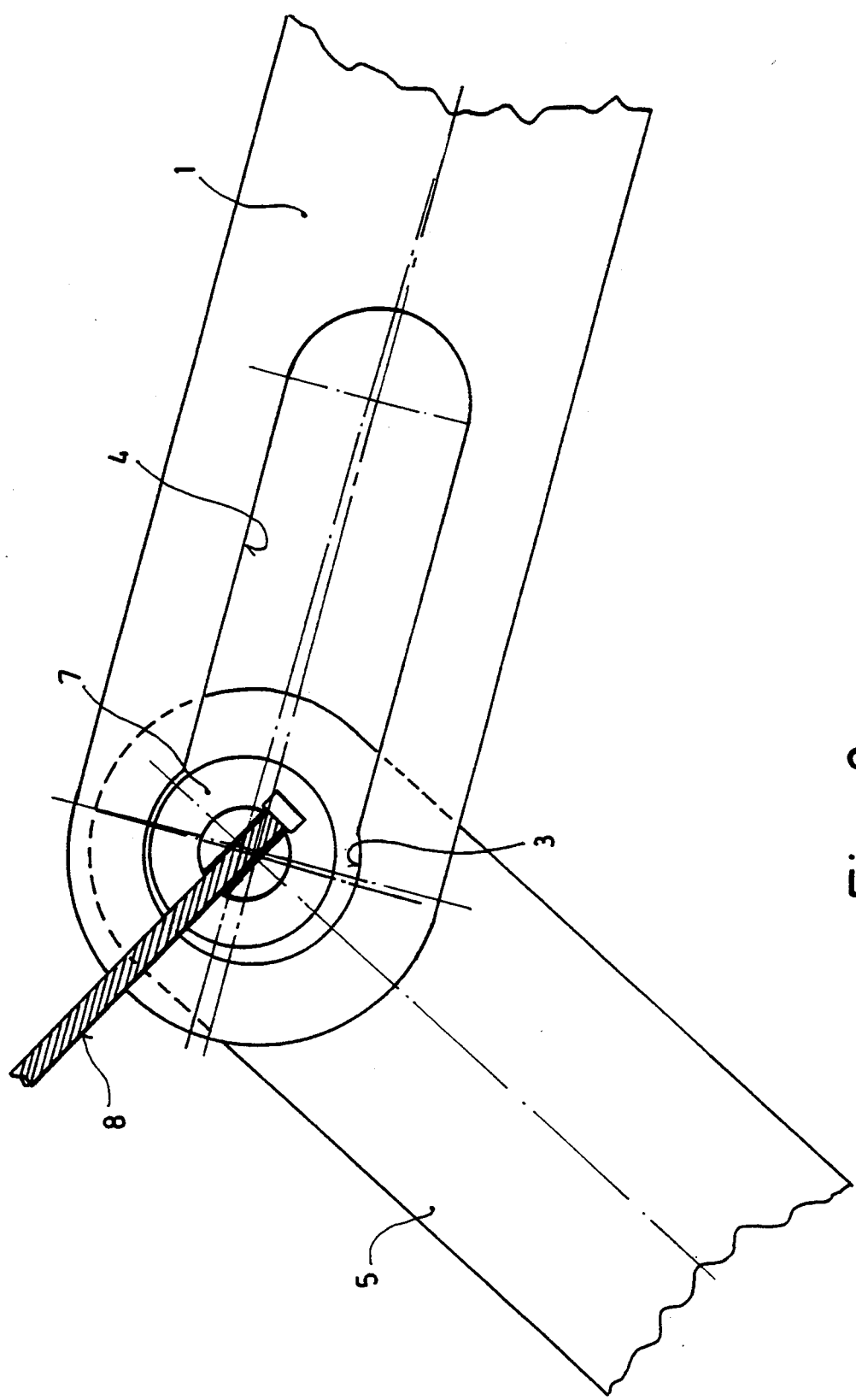
FIG. 2 shows an enlarged section of FIGURE 1.
Figure 4:
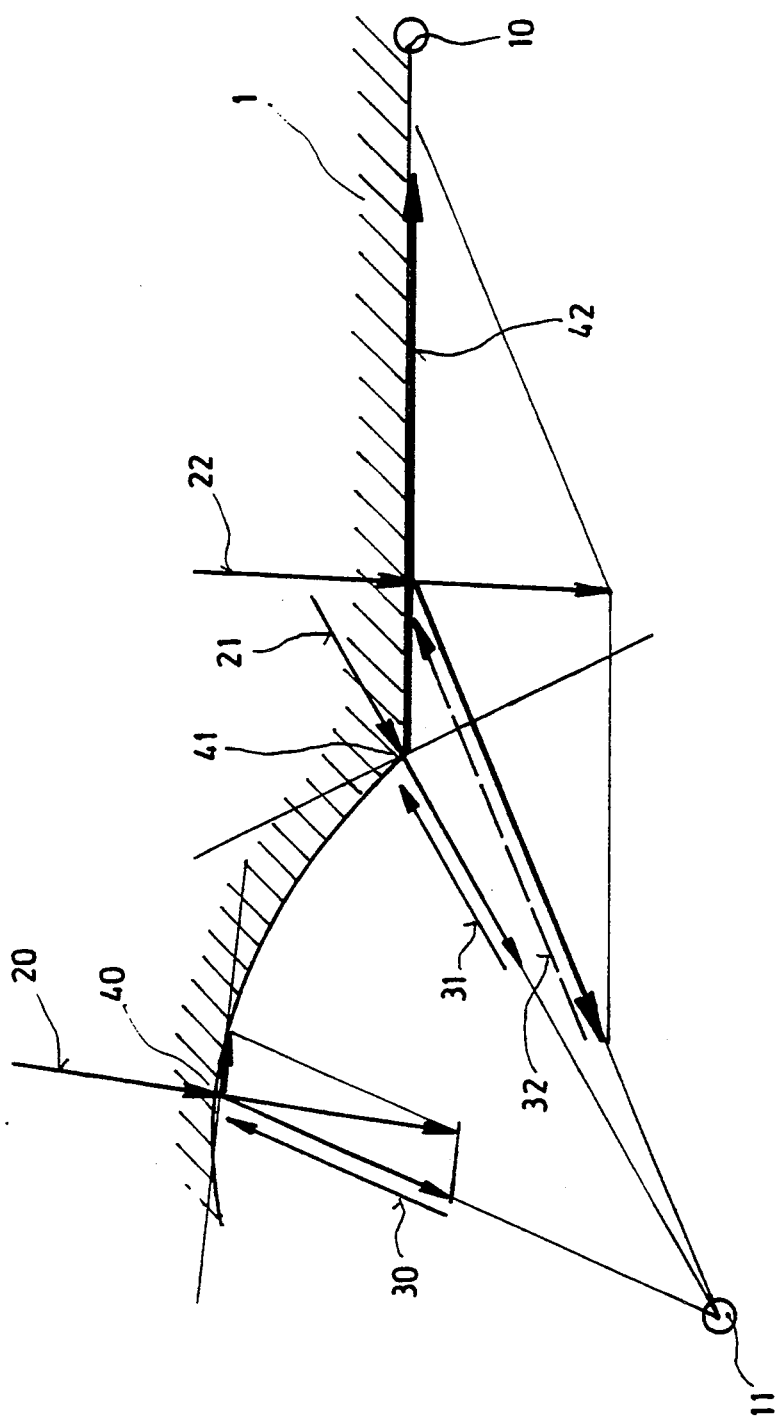
FIG. 4 shows the vectorial force relationships in the basic mode of operation of the locking mechanism of the invention.

The locking mechanism shown in FIG. 1 consists of the guide lever arm (1) and a sliding lever arm (5), in which one end of each of the lever arms pivots about a bearing (10) or (11) at a certain distance from the other lever arm in which the other end of the sliding lever arm (5) is slidingly coupled with a slot (4) in the other end of the guide lever arm (1) by a pin (7) connected with the sliding lever arm (5), and in which the lever arms can be swiveled into two end positions. The guide lever arm (1) is mechanically coupled with, for example, a flap (9), to which, under certain conditions, a force is applied, which tries to swivel the guide lever arm (1) into the other end position. This force (2) for swiveling from this end position into the other end position is counteracted by providing a recess (3) in the slot (4) in the area of the other end of the guide lever arm (11), which slot compensates this force in a selflocking way, and the locking can be removed only by a force (6) exerted on the sliding lever arm (5) in the direction of the other end position. The recess (3) is characterized by an arc-shaped surface with a sectoral cutout angle greater than 180 degrees, and it has a diameter only slightly greater than the width of the slot (4), so that the recess (3) merges with the slot (4). The force (6) is applied to the sliding lever arm (5) by a Bowden cable (8) at the pin (7). This allows the locking mechanism to move from one end position to the other, such that in each of the end positions forces (2) are applied, for example, to the flap (9). Since the recess (3) runs symmetrically to the axis of the slot (4), it has its effect in each of the two end positions. The diameter of the pin (7) corresponds approximately to the width of the slot (4), and the pin can slide in the slot analogously to an inclined plane. The basic action of the selflocking will be explained with references to FIG. 4. The guide lever arm (1) is drawn schematically. It pivots about the bearing (10), and the sliding lever arm (5) is shown only with reference to the reaction force as a vectorial symbol that acts from the bearing (11) as the source. 20 designates a force which, for example, can originate from the flat (9) of FIG. 1. This force is counteracted by the reaction force (30), which is applied from the bearing (11), and is resolved in a force parallelogram into a tangential component and a component that acts on the bearing (11). This component is compensated by the force (30), while the sliding lever arm (5) is shifted to the right by the tangential component (40). In this connection, the tangential component (40) rapidly becomes smaller until it reaches a magnitude of 0. In this case, the action force (21) and the reaction force (31) equally oppose and compensate each other. If the force (21) is increased by pressure on the guide lever arm (1), the reaction force (31) also increases. Since the tangential component (41) is 0, the sliding lever arm (5) does not move. It remains in place. Only after the pin (7) slides out of the area of the recess (3), which is possible only if a force is exerted on the pin via the Bowden cable (8) or similar mechanical device in the direction of the other end position, can the sliding lever arm (5) slide along the slide surfaces of the slot (4), or a force, which then acts on the guide lever arm (1), moves the pin (7) of the sliding lever arm (5) in the direction of the other end position. This is illustrated with the parallelogram of forces (22), (32) and (42), which shows that with the amount after a constant force (22), a significantly greater tangential component (42) is achieved.

Figure 3:
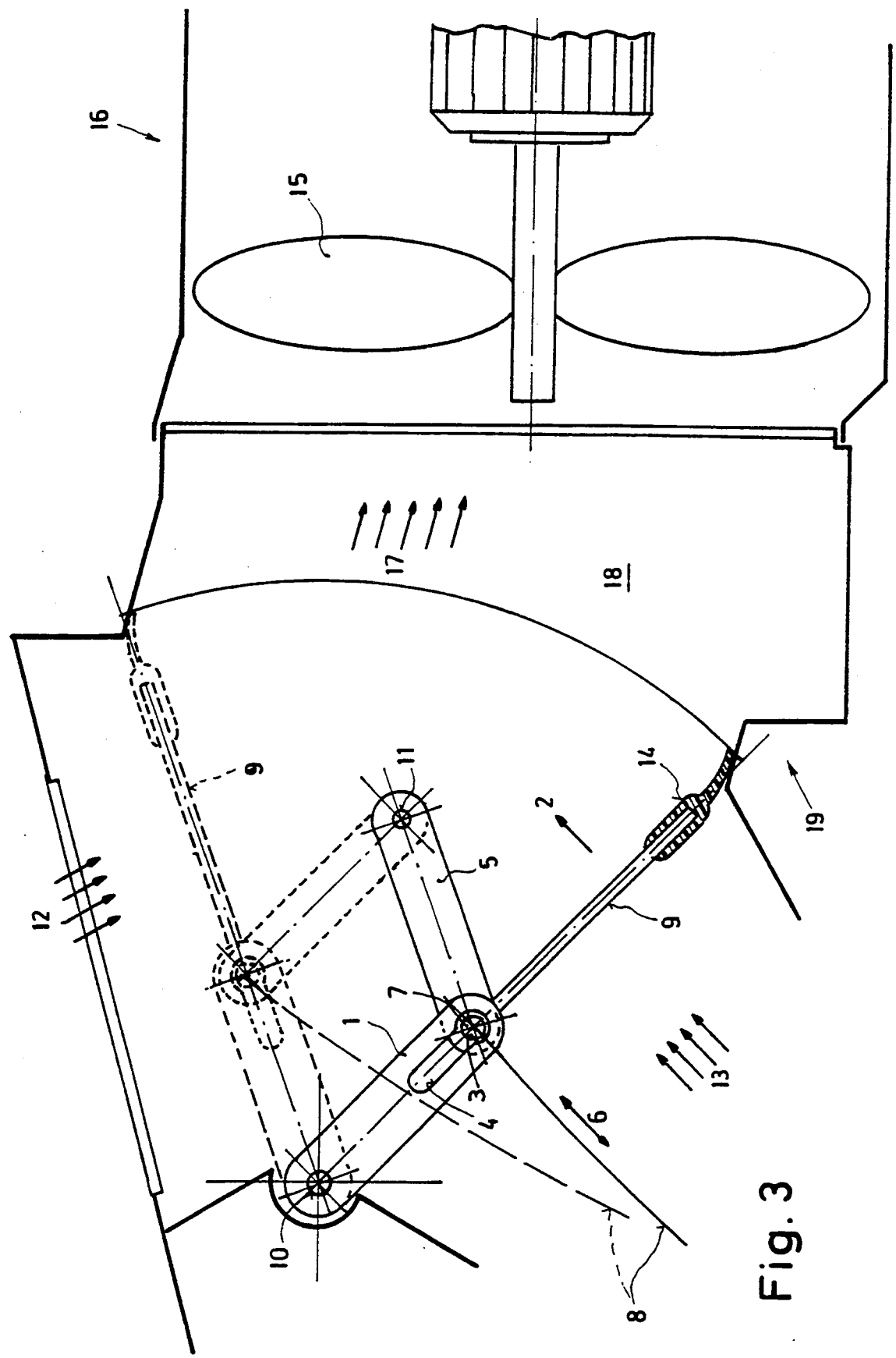
FIG. 3 shows an application of the locking mechanism to the position of the flaps of an automotive fan system.

FIG. 3 shows a practical application. The guide lever arm (1) is shown with slot (4) and recess (3), in which pin (7) of the sliding arm (5) slides. One of the end positions is indicated by broken lines. In the present end position, which is indicated by solid lines, the guide lever arm is coupled with a flap (9), at the end of which a rubber lip (14) is attached, which is designed to compensate for any variations in clearance. The rubber lip (14) fits tightly against a housing (19), which contains, for example, an automotive fan (16) with an impeller (15). In the example, shown here, the fan sucks air (17) through the fresh-air opening (22), resulting in the development of a vacuum space (18) in front of the impeller (15). This vacuum produces a force (2) on the flat (9) and tries to move the flap (9) out of this end position, which would mean that circulating air would also be sucked in by the fan. This is counteracted by the self-locking action of the locking mechanism, for the coupling of the flap (9) with the guide lever arm (1) results in the development of force relationships in the recess, as was specified in the explanations to FIG. 4. The flap is able to move into the position "circulating-air operation" only when a force (6) is applied to the sliding lever arm (5) via the Bowden cable (8), which is attached to the pin (7), to remove the self-locking, effect of the locking mechanism. The same conditions apply in the other end position, in which the fresh-air supply (12) is closed, and circulating air (13) is drawn in by the fan.

I claim:

1. Locking mechanism consisting of a guide lever arm and sliding lever arm, in which one end of each of the lever arms pivots about a bearing at a certain distance from the other lever arm, in which the other end of the sliding lever arm is slidingly coupled with a slot in the other end of the guide lever arm by a pin connected with the sliding lever arm, and in which the lever arms can be swiveled into two end positions, characterized by the fact that a force (2) exerted on the guide lever arm (1) in one of the end positions for the purpose of swiveling the guide lever arm (1) into the other end position is compensated in a self-locking way in the slot (4) by a recess (3) in the area of the other end of the guide lever arm (1), said recess having an arc-shaped surface with a sectoral cutout angle greater than 180 degrees and a diameter which is only slightly greater than the width of the slot (4), so that the recess (3) merges with the slot (4), and that this self locking effect can be removed only by a force (6) exerted on the sliding lever arm (5) in the direction of the other end position.

* * * * *